(12) United States Patent
Sanjeev et al.

(10) Patent No.: US 8,509,212 B2
(45) Date of Patent: Aug. 13, 2013

(54) METHOD AND SYSTEM OF RECOVERING LOST MOBILE DEVICES

(75) Inventors: Kumar Sanjeev, San Ramon, CA (US); Ashwin Kamath, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 889 days.

(21) Appl. No.: 12/564,516

(22) Filed: Sep. 22, 2009

(65) Prior Publication Data

US 2011/0070898 A1 Mar. 24, 2011

(51) Int. Cl.
*H04J 3/06* (2006.01)
*H04M 1/66* (2006.01)
*H04M 3/00* (2006.01)
*H04W 24/00* (2009.01)
*G01S 19/27* (2010.01)
*G08B 1/08* (2006.01)

(52) U.S. Cl.
USPC ........ 370/350; 455/411; 455/419; 455/456.2; 342/357.66; 340/539.13

(58) Field of Classification Search
USPC ........ 370/350; 455/411; 342/357.1; 705/10
See application file for complete search history.

(56) References Cited

U.S. PATENT DOCUMENTS

2003/0117316 A1* 6/2003 Tischer ............... 342/357.1
2010/0169154 A1* 7/2010 Kraft et al. ............. 705/10
2010/0216429 A1* 8/2010 Mahajan ............... 455/411

* cited by examiner

*Primary Examiner* — Ian N Moore
*Assistant Examiner* — Kiet Tang

(57) ABSTRACT

An approach is provided for remotely controlling and/or tracking mobile devices. A request is received to track a mobile device. A control signal is generated, in response to the request, to remotely activate an application on the mobile device for controlling an audio interface or an imaging interface of the mobile device to capture a signal from the audio interface or the imaging interface.

13 Claims, 11 Drawing Sheets

METHOD AND SYSTEM OF RECOVERING LOST MOBILE DEVICES

BACKGROUND INFORMATION

Consumer adoption of mobile devices, such as cellular telephones, laptop computers, pagers, personal digital assistants, and the like, is increasing. These devices can be used for a diversity of purposes ranging from basic communications, to conducting business transactions, to managing entertainment media, as well as a host of other tasks. Additional enhancements, such as location-awareness features, e.g., global positioning system (GPS) tracking, also enable mobile device users to monitor their position and present their location via a local display. As such, mobile devices tend to store an abundant amount of personal or otherwise sensitive information. Unfortunately, the portability and size of these devices often leads to device misplacement, loss, and even theft, all of which translate into an inability to safeguard this personal information. In the event that a user's mobile device does go missing (for whatever the cause), the likelihood of locating and retrieving the device or determining the identity of a potential perpetrator is very low.

Therefore, there is a need for an approach that can efficiently and effectively provide remote mobile device control and tracking.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing remote control and tracking services for mobile devices are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to remotely controlling and tracking mobile devices to protect against theft and to enable recovery, it is contemplated that various exemplary embodiments are also applicable to stationary devices as well as other applications.

Figure 1:
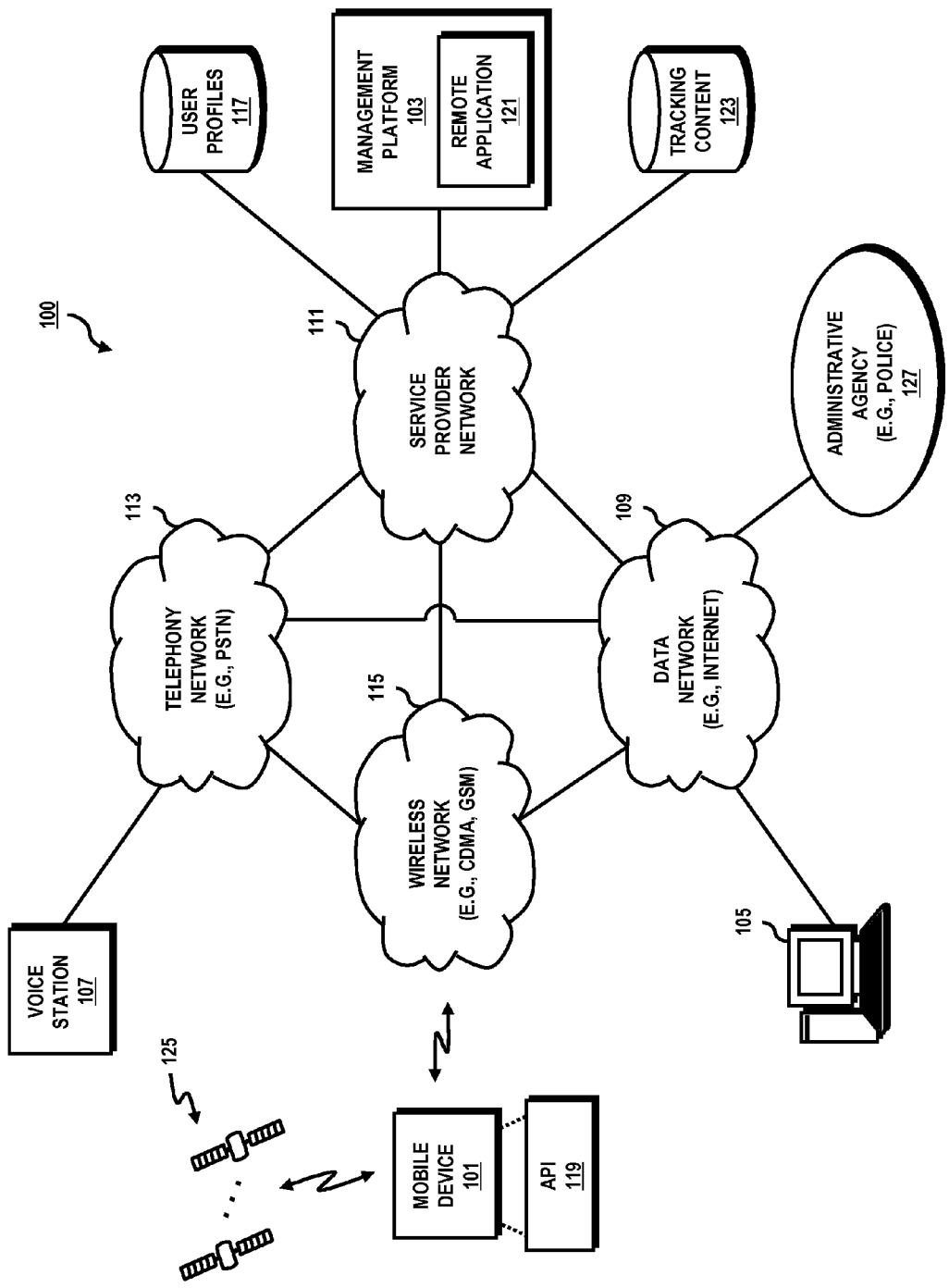
FIG. 1 is a diagram of a system configured to provide remote control and tracking services for mobile devices, according to an exemplary embodiment.

FIG. 1 is a diagram of a system configured to provide remote control and tracking services for mobile devices, according to an exemplary embodiment. For the purpose of illustration, system 100 for remotely controlling and tracking one or more mobile devices 101, such as one or more cellular phones, is described with respect to management platform (or platform) 103. According to certain embodiments, users at user or client devices (e.g., computing device 105, voice station 107, or another mobile device (not shown)) may access the features and functionalities of platform 103 over one or more networks, such as data network 109, service provider network 111, telephony network 113, and/or wireless network 115, in order to remotely determine and monitor the location and/or surrounding environment of their mobile devices 101 when, for instance, the users misplace (or otherwise lose) these devices 101. Additionally (or alternatively), platform 103 may enable users to remotely control mobile devices 101 in order to, for example, backup or erase a memory (not shown), capture signals from an interface (e.g., audio interface, imaging interface, etc.), configure (or reconfigure) functions, obtain usage logs, terminate services, etc., of or associated with these devices 101. While specific reference will be made hereto, it is contemplated that system 100 may embody many forms and include multiple and/or alternative components and facilities.

It is observed that portable device users who enjoy an increased level of mobility have to be mindful of their location, as well as keep a vigilant eye on their devices to ensure the devices and/or information stored thereon is not misplaced, lost, or stolen. Traditionally, when a portable device went missing, for whatever the cause, the use of conventional approaches to locate and recover the device or, at least, identify a potential perpetrator, e.g., a thief, has yielded little, if any, success. Moreover, most mobile device owners rely on password and encryption techniques to protect valuable or otherwise sensitive information stored to their devices; however, even encrypted data, once in the hands of another, may be eventually decrypted. As a consequence, a void exists in the marketplace for effective and efficient techniques to remotely control and track mobile devices, such as for the purpose of locating and recovering missing devices or identifying potential perpetrators.

Therefore, the approach of system 100, according to certain exemplary embodiments, stems from the recognition that consumers can benefit from remote control and tracking services, whereby subscribers (or users) are given access to a management platform for remotely activating at least one application on their devices, such as one or more mobile devices, for locating and/or controlling these devices. For instance, subscribers may access the management platform for remotely activating an application on a mobile device for controlling an audio interface (e.g., a microphone) and/or an imaging interface (e.g., a camera) of the mobile device to capture one or more signals from the audio interface or the imaging interface. Captured signals may relate to acoustic and/or visual indicia of an environment surrounding the mobile device, which may be utilized by a subscriber to locate and retrieve their device or identify a potential perpetrator who may have stolen or inadvertently taken possession of the device. In other instances, remotely activating an application on the mobile device may cause the mobile device to return spatial positioning information (e.g., an address, latitude, longitude, elevation, etc.) corresponding to a location of the device. This spatial positioning information may be overlaid on, for instance, a topological depiction of a geographic area surrounding the location of the device, which may also be appended with various cartographic features, such as buildings, landmarks, roadways, signs, and the like, or provided with directions to the location of the device. Subscribers may also be given access to the management platform to remotely activate at least one application on their device to control or configure one or more features of the device. For example, an application may be remotely activated in order to image (or backup) a memory of a mobile device, as well as store the image to, for instance, a networked repository. Subscribers may also be enabled to erase a memory of the mobile device, such as for the purpose of purging the device of personal or otherwise sensitive information. Still further, an application may be remotely activated in order to configure features of or services available to the mobile device, such as to monitor or deactivate an ability of the mobile device to transmit and receive information.

Accordingly, in some embodiments, system 100 facilitates remote mobile device controlling and tracking by enabling subscribers (or users) to access management platform 103 via one or more client devices (e.g., computing device 105, voice station 107, or another mobile device (not shown)) to register to the remote control and tracking services of system 100, as well as to create, customize, and manage one or more user profiles stored to, for example, user profiles repository 117 or any other suitable storage location of (or accessible to) the components or facilities of system 100. In this manner, subscribers may submit requests to platform 103 in order to remotely control, configure, monitor, register, and/or track their mobile devices 101. In response thereto, platform 103 may generate one or more control signals to remotely activate one or more applications (or application programming interfaces (API)) 119 on mobile devices 101 for remotely controlling, configuring, monitoring, and/or tracking these devices 101. Control signals may be transmitted to mobile devices 101 over one or more of networks 109-115, such as transmitted over one or more of networks 109-115 as part of one or more API 119 directed messages (e.g., API 119 short messaging service (SMS) directed messages). It is noted that management platform 103 is described in more detail in accordance with FIG. 2.

In certain exemplary embodiments, access to platform 103 may be obtained via any suitable portal interface (not illustrated), such as a voice portal or a web portal. For example, a networked remote application 121 for implementing the portal may be deployed via platform 103; however, it is contemplated that another facility or component of system 100, such as a frontend, middleware, or backend server, may deploy remote application 121 and, consequently, interface with platform 103. As such, it is contemplated that remote application 121 may be implemented on one or more of client devices 101, 105, and/or 107 and, thereby, configured to interface with platform 103. In certain embodiments, one or more remote applications 121 may function in conjunction with one another to achieve the features and functionalities of system 100, such as one or more of the processes described herein for remotely controlling and/or tracking mobile devices 101.

The portal may include or provide users with the ability to access, configure, manage, and store user profile information to user profiles repository 117, as well as the ability to remotely control, configure, monitor, and/or track their mobile devices 101. As such, platform 103 may be configured to receive or retrieve tracking content from mobile devices 101 and, thereby, store this tracking content to, for example, tracking content repository 123. It is contemplated that tracking content may be additionally (or alternatively) stored to any other suitable storage location or memory of (or accessible to) the components or facilities of system 100. Further, tracking content may generally relate to any signals or information retrieved (or received) from mobile devices 101 that have been (or currently are being) remotely controlled, configured, monitored, tracked, etc. In this manner, the portal may provide subscribers with access to tracking content of tracking content repository 123.

As seen in FIG. 1, platform 103 includes remote application 121 for generating commands, instructions, parameters, and/or signals (hereinafter collectively referred to as "control signals") that may be executed on (or by) mobile device 101 via API(s) 119. These control signals are utilized to remotely activate API(s) 119 to control, configure, monitor, or track mobile device 101 in response to, for instance, a request to control, configure, monitor, or track mobile device 101 by an authorized subscriber of the remote control and tracking services of system 100. In this manner, the control signals may be utilized to generate, store, or otherwise implement configuration information based on received control signal(s). According to one embodiment, control signals may also be utilized to control an audio interface (e.g., a microphone) or an imaging interface (e.g., a camera) of mobile device 101 to capture one or more signals from the audio interface or the imaging interface. Captured signals may relate to acoustic and/or visual indicia of an environment surrounding mobile device 101, which may be utilized by a subscriber to locate and retrieve their device or identify a potential perpetrator who may have stolen or inadvertently taken possession of the device.

In other instances, remote application 121 may generate control signals to remotely activating API(s) 119 on mobile device 101 to cause mobile device 101 to return spatial positioning information (e.g., an address, latitude, longitude, elevation, etc.) corresponding to a location of mobile device 101. Accordingly, mobile device 101 may be configured to determine corresponding spatial positioning information through conventional satellite positioning system (SPS) technology, such as GPS technology; however, any suitable navigational or location determination technology may be utilized, such as advanced forward link trilateration (A-FLT), assisted-GPS (A-GPS), enhanced cellular identification (CELL-ID), wireless area network (WLAN) positioning, etc. As is well known, SPS technology utilizes a constellation 125 of satellites that transmit signals to receivers (not shown) of, for example, one or more mobile devices 101, so that the receivers may determine corresponding spatial positions (or locations), speeds, directions, and/or timing for mobile devices 101. Mobile devices 101 may report this information to platform 103 to facilitate the remote control and/or tracking services of system 100. It is also noted that platform 103 may "poll" or receive such spatial positioning information from mobile devices 101 in real-time, so as to provide presence service features related to mobile devices 101. As such, the location of, for instance, mobile device 101 may be detected without mobile device 101 having to initiate a phone call or other like communication session. Thus, platform 103 may be configured to present received and/or retrieved spatial positioning information to subscribers, such as via one or more GUI(s). It is also noted that spatial positioning information may be stored to user profiles repository 117 or any other suitable storage location or memory of (or accessible to) system 100.

Accordingly to particular embodiments, spatial positioning information corresponding to a location of mobile device 101 may be overlaid on, for instance, a topological depiction of a geographic area surrounding the location of mobile device 101, which may also be appended with various cartographic features, such as buildings, landmarks, roadways, signs, and the like, or provided with directions to the location of mobile device 101.

Subscribers may also be given access to the management platform to remotely activate API(s) 119 on mobile devices 101 to control or configure one or more features of the device. For example, API(s) 119 may be remotely activated in order to image (or backup) a memory (not shown) of mobile device 101, as well as store the image to, for instance, a networked repository, such as tracking content repository 123. Subscribers may also be enabled to erase a memory of mobile device 101, such as for the purpose of purging mobile device 101 of personal or otherwise sensitive information. Still further, API(s) 119 may be remotely activated to configure features of or services available to mobile device 101, such as to monitor or deactivate an ability of mobile device 101 to transmit and receive information. For instance, control signals may be transmitted to mobile device 101 by platform 103 in order to "lock" mobile device 101 until an appropriate "unlock" code (or signal) is input (or transmitted) to device 101. As another example, subscribers may be enabled to request platform 103 to monitor usage of mobile device 101 and, thereby, provide a "log" of such use, which may also enable subscribers to determine whether or not their devices have been stolen and/or being utilized for illicit (or otherwise unauthorized) purposes.

Accordingly, platform 103 via, for example, remote application 121 may be configured to issue control signals via various bearers to mobile devices 101, such as in the form of one or more call control setup messages, short messaging service (SMS) messages, enhanced messaging service (EMS) messages, multimedia messaging service (MMS) messages, electronic mail, files, or any other suitable bearer, as well as any suitable combination thereof. In particular implementations, these bearer mediums may include control signals in various forms, including attention (AT) commands, menu traversal paths, function codes, voice data, dual-tone multi-frequency (DTMF) signals, scripts, strings, parameters, object variables, and the like. It is noted that these control signals can be used in lieu of "software code," and therefore, may be directly integrated into the control logic of mobile device 101, thereby requiring less processing and hence, less power. It is contemplated, however, that coded instructions may also be utilized. As such, these control signals may be utilized by API(s) 119 to facilitate the remote control and/or tracking services of system 100.

It is noted that control signals generated by, for example, remote application 121 of platform 103 may be transmitted to mobile devices 101 via one or more of communication networks 109-115. To prevent unauthorized individuals from accessing the remote control and/or tracking services of platform 103, authentication information may be required. For instance, a username and password procedure may be employed. According to one embodiment, subscribers may be required to enter a code (e.g., personal identification number (PIN), etc.) before accessing the features and functionality of platform 103. Similarly, to prevent the implementation of unauthorized control signals otherwise received at mobile device 101, platform 103 may include an authentication identifier when transmitting control signals to mobile devices 101. For instance, control signals may be encrypted, either symmetrically or asymmetrically, such that a hash value can be utilized to authenticate received control signals, as well as ensure that those control signals have not been impermissibly alerted in transit. As such, control signals may include various identifiers, keys, random numbers, random handshakes, digital signatures, and the like. Further, these authenticating schemas may themselves be encrypted or otherwise secured.

According to exemplary embodiments, mobile devices 101 may include one or more application protocol interfaces (API), such as a set of APIs included within, for example, a binary runtime environment for wireless (BREW) platform, for receiving control signals from platform 103 and, thereby, for being remotely activated, controlled, configured, monitored, tracked, etc., by platform 103. It is contemplated, however, that one or more other mobile client applications may be utilized, such as one or more applications written in one or more programming languages, such as C, C++, J2ME, Java, etc. As such, API(s) 119 may be configured to, in response to control signals being received from, for instance, platform 103, enable one or more signals to be captured from an audio interface (e.g., a microphone) or an imaging interface (e.g., a camera) of mobile device 101. These signals may relate to acoustic(s) or image(s) of an environment surrounding mobile device 101. In other instances, API(s) 119 may determine spatial positioning, backup or erase a memory (not shown), configure (or reconfigure) functions, obtain usage logs, terminate services, etc., of or associated with mobile devices 101.

In exemplary embodiments, mobile devices 101 transmit, via one or more of networks 109-115, the one or more signals captured from an audio interface and/or an imaging interface of mobile devices 101 to platform 103. Other information or signals may also be transmitted by mobile devices 101 to platform 103, such as spatial positioning information, device usage information, images of memories of mobile devices 101, etc. These signals and/or information may be stored to any suitable storage location or memory of (or accessible to) the components and/or facilities of system 100, such as tracking content repository 123. In other instances, the signals and/or information may be presented to subscribers, such as via one or more GUI(s). Exemplary GUIs for remotely controlling and tracking a mobile device 101 and presenting signals and/or information provided by controlled or tracked mobile devices 101 to subscribers are described in more detail in accordance with FIGS. 8 and 6, respectively.

Still further, remote application 121 may enable subscribers to report a status of their mobile devices 101 to an administrative agency 127, such as for reporting a mobile device 101 as lost, misplaced, stolen, etc. Subscribers may generate user profiles including one or more variables, values, parameters, polices, etc., for specifying one or more particular administrative agencies 127 that are to receive generated reports, such as one or more police departments within a predetermined vicinity of the environment surrounding a tracked and located mobile device 101, a manager of an organization responsible for the mobile device 101, etc. It is noted that generated reports may also include one or more of the captured signals and/or information received from mobile device 101. For instance, a report may include information tracking the spatial positioning of mobile device 101 in real-time, such that the administrative agency 127 (or other authorized individuals or entities) can "chase after" mobile device 101. Such a scenario can be useful when mobile device 101 is stolen and the authorities (e.g., police) are dispatched to retrieve device 101 from the perpetrator(s).

As seen in FIG. 1, service provider network 111 enables client devices 101, 105, and 107 to access the features and functionality of platform 103 via one or more of networks 109, 113, and 115. Networks 109-115 may be any suitable wireline and/or wireless network. For example, telephony network 113 may include a circuit-switched network, such as the public switched telephone network (PSTN), an integrated services digital network (ISDN), a private branch exchange (PBX), or other like network. Wireless network 115 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 109 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 109-115 may be completely or partially contained within one another, or may embody one or more of the aforementioned infrastructures. For instance, service provider network 111 may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, networks 109-115 may embody or include portions of a signaling system 7 (SS7) network, or other suitable infrastructure to support control and signaling functions. As such, the conjunction of networks 109-115 may be adapted to facilitate the remote control and tracking services of system 100.

According to exemplary embodiments, client devices 101, 105, and 107 may include any customer premise equipment (CPE) capable of sending and/or receiving information over one or more of networks 109-115. For instance, voice terminal 107 may be any suitable plain old telephone service (POTS) device, facsimile machine, etc., whereas mobile terminal 101 may be any cellular phone, radiophone, satellite phone, smart phone, wireless phone, or any other suitable mobile device, such as a personal digital assistant (PDA), pocket personal computer, tablet, customized hardware, etc. Further, computing device 105 may be any suitable computing device, such as a VoIP phone, skinny client control protocol (SCCP) phone, session initiation protocol (SIP) phone, IP phone, personal computer, softphone, workstation, terminal, server, etc. Even though only a limited number of user devices 101, 105, and 107 are illustrated, it is contemplated that system 100 can support a plurality of user devices 101, 105, and 107.

As previously mentioned, system 100 may also include user profiles repository 117 for storing subscriber information, such as billing information, contact information, demographic information, location information, mobile station configurations, subscription parameters, and the like. User profiles repository 117 may also be utilized to store data relating to authorized users of the remote control and tracking services of system 100, as well as associated authorization information corresponding to those users. Namely, a user of mobile device 101 may establish one or more sub-profiles including usernames, passwords, codes, PINs, etc. to further distinguish various override scenarios. While user profiles repository 117 is depicted as an extension of service provider network 111, it is contemplated that user profiles repository 117 can be integrated into, collocated at, or otherwise in communication with any of the components or facilities of system 100.

In this manner, repositories 117 and 123 may be maintained by a service provider of the remote control and tracking services of system 100 or may be maintained by any suitable third-party. It is contemplated that the physical implementation of repositories 117 and 123 may take on many forms, including, for example, portions of existing repositories of a service provider, new repositories of a service provider, third-party repositories, and/or shared-repositories. As such, repositories 117 and 123 may be configured for communication over system 100 through any suitable messaging protocol, such as lightweight directory access protocol (LDAP), extensible markup language (XML), open database connectivity (ODBC), structured query language (SQL), and the like, as well as combinations thereof. In those instances when repositories 117 and 123 are provided in distributed fashions, information and content available via repositories 117 and 123 may be located utilizing any suitable querying technique, such as electronic number matching, distributed universal number discovery (DUNDi), uniform resource identifiers (URI), etc.

Thus, a subscriber of (or an individual authorized to use) the remote control and tracking services of system 100 may initialize a communication session at client devices 105 and 107, as well as at another mobile unit (not shown) to interact with remote application 121 so as to remotely control, configure, monitor, track, etc., mobile device 101. Furthermore, although the remote control and tracking services are described with respect to a mobile device 101, it is recognized that the remote control and tracking services may be applied to any device capable of providing voice communications, such as client devices 105 and 107. In other instance, mobile devices 101 may be integrated with other devices, individuals, objects, etc., and thereby enable subscribers to remotely control, configure, monitor, and/or track these other devices, individuals, objects, etc. While system 100 has been described in accordance with the depicted embodiment of FIG. 1, it is contemplated that system 100 may embody many forms and include multiple and/or alternative components and facilities.

Figure 2:
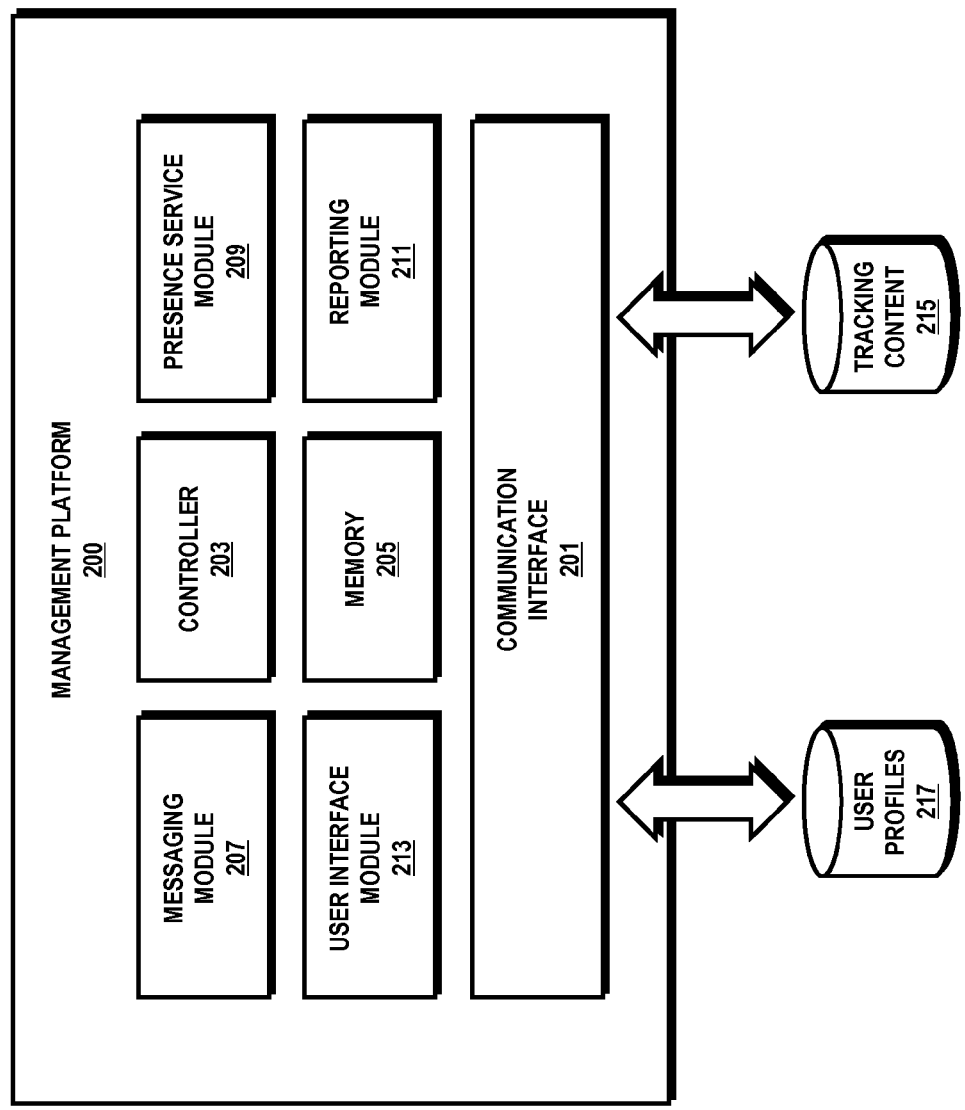
FIG. 2 is a diagram of a platform capable of providing remote control and tracking services for mobile devices, according to an exemplary embodiment.

FIG. 2 is a diagram of a tracking platform capable of providing remote control and tracking services, according to an exemplary embodiment. Tracking platform (or platform) 200 may comprise computing hardware (such as described with respect to FIG. 10), as well as include one or more components configured to execute the processes described herein for providing the remote control and tracking services of system 100. In one implementation, platform 200 includes communication interface 201, controller (or processor) 203, memory 205, messaging module 207, presence service module 209, reporting module 211, and user interface module 213. Platform 200 may also communicate with one or more repositories, such as tracking content repository 215 and user profiles repository 217. Users may access platform 200 (or the features and functionality provided thereby) via client devices 101, 105, and 107. While specific reference will be made to this particular implementation, it is also contemplated that platform 200 may embody many forms and include multiple and/or alternative components. For example, it is contemplated that the components of platform 200 may be combined, located in separate structures, or separate locations.

According to one embodiment, platform 200 embodies one or more application servers accessible to client devices 101, 103, and 105 over one or more networks 109-115. Users (or subscribers) can access platform 200 to create, customize, and manage one or more user profiles (such as for the purpose of registering mobile devices 101 with the remote control and tracking services of system 100), as well as for remotely controlling and tracking one or more of these registered mobile devices 101. As such, platform 200 may provide a user interface, e.g., web portal or other networked application, to permit user to access the features and functionality of platform 200 via client devices 101, 105, and 107. According to certain embodiments, user interface module 213 may be configured for exchanging information between client devices 101, 105, and 107 and a web browser or other network-based application or system, such as a voice browser or interactive voice recognition system.

In exemplary embodiments, user interface module 213 may be configured to execute one or more GUIs that are configured to provide users with one or more menus of options for creating, customizing, and managing user profiles, as well as engaging with the other features and functionalities of the remote control and tracking services of system 100, such as to enable subscribers to remotely determine and monitor the location and/or surrounding environment of mobile devices 101 when, for instance, the users misplace (or otherwise lose) their devices 101. Additionally (or alternatively), platform 200 may enable users to remotely control mobile devices 101 in order to, for example, backup or erase a memory (not shown), capture signals from an interface (e.g., audio interface, imaging interface, etc.), configure (or reconfigure) functions, obtain usage logs, terminate services, etc., of or associated with these devices 101. As previously mentioned, exemplary GUIs are described in more detail in accordance with FIGS. 6 and 8.

In this manner, user interface module 213 (via communication interface 201) may be configured to receive requests for remotely controlling, configuring, monitoring, tracking, etc., mobile devices 101. For example, a subscriber may access platform 200 via a suitable client device (e.g., computing device 105) to remotely control and/or track their lost or otherwise misplaced mobile device 101. The subscriber may submit a corresponding request to track mobile device 101 and, in response thereto, user interface module 213 may port the request to messaging module 207 for generating suitable control signals for remotely controlling and/or tracking mobile device 101.

Accordingly, messaging module 207 is configured to generate one or more control signals based on the request that, when received by mobile device 101, are configured to remotely activate one or more applications (e.g., API(s) 119) on mobile device 101. The control signals may further be configured to control an audio interface or an imaging interface of mobile device 101, such as to remotely capture one or more signals from the audio interface or the imaging interface, which provide indicia related to an environment surrounding mobile device 101. In this manner, messaging module 207 via, for example, communication interface 201, may also be configured to transmit generated control signal(s) to mobile device 101, such as over one or more communication networks 109-115 and, in response thereto, configured to receive one or more captured signal(s) from mobile device 101 that are related to the environment surrounding mobile device 101. As will become more apparent below, messaging module 207, via communication interface 201, may also be configured to receive other information from mobile device 101, such as spatial positioning information relating to a location of mobile device 101, an image of a memory of mobile device 101, a usage log of mobile device 101, etc.

According to exemplary embodiments, messaging module 207 may be configured to generate control signals for transmission to mobile device 101 utilizing any suitable bearer, such one or more call control setup messages, short messaging service (SMS) messages, enhanced messaging service (EMS) messages, multimedia messaging service (MMS) messages, electronic mail, files, or any other suitable bearer, as well as any suitable combination thereof. In particular implementations, these bearer mediums may include control signals in various forms, including attention (AT) commands, menu traversal paths, function codes, voice data, dual-tone multi-frequency (DTMF) signals, scripts, strings, parameters, object variables, and the like. It is noted that these control signals can be used in lieu of "software code," and therefore, may be directly integrated into the control logic of mobile device 101, thereby requiring less processing and hence, less power. It is contemplated, however, that coded instructions may also be utilized. It is also contemplated that these control signals and/or bearers may be API directed, such as BREW directed.

As seen in FIG. 2, platform 200 may include presence service module 209 for receiving and, thereby, tracking real-time spatial positioning information from corresponding mobile devices 101. Additionally, presence service module 209 may "poll" mobile devices 101 for spatial positioning information, as well as capture presence information or availability of mobile devices 101. An exemplary model for presence determination is detailed in Internet Engineering Task Force (IETF) Request for Comment (RFC) 2778, which is incorporated herein by reference in its entirety. According to certain exemplary embodiments, the presence or availability of mobile devices 101 may be utilized to determine whether control signals may be transmitted to mobile devices 101, as well provide subscribers with additional information for retrieving their mobile device 101 or ascertaining the identity of a potential perpetrator.

In this manner, captured signals and/or information received from mobile devices 101 may be stored to tracking content repository 215 or any other suitable storage location or memory of (or accessible to) platform 200, such as memory 205. This tracking content may also be ported to user interface module 213 for presentation to subscribers via the one or more GUIs. It is noted that this tracking content may relate to signals captured from an audio interface (e.g., a microphone) or an imaging interface (e.g., a camera) of mobile device 101, spatial positioning information relating to a location of mobile device 101, a device usage log corresponding to use of mobile device 101, an image of a memory of mobile device 101, etc., as well as any other suitable content that may facilitate the retrieval of lost, stolen, or otherwise misplaced mobile devices 101 or assist in the identification of a potential perpetrator.

According to exemplary embodiments, presenting tracking content to a subscriber enables the subscribers to determine a location of their devices 101. As such, user interface module 213 may be configured to convey the location (or spatial position) of a mobile device 101 to the subscriber, which may be provided as a short or multimedia message or provided within an automated or personnel-based voice call.

In certain embodiments, the spatial position or location of a mobile device 101 may be overlaid on a topical depiction (or map) of a cartographic or geographic area, such that pinpointing the location of mobile device 101 can be quickly ascertained. It is also contemplated that user interface module 213 may provide routing directions for directing the subscriber to the location of the lost, misplaced, or stolen device.

Subscribers may also utilize the features and functionalities of platform 200 to report a status of their mobile device 101 to an administrative agency, such as for reporting a mobile device 101 as lost, misplaced, stolen, etc. In this manner, user interface module 213 may provide one or more menus, options, tasks, routines, selections, etc., to enable subscribers to submit such requests. A request to report a mobile device status to one or more administrative agencies 127 may be ported to reporting module 211. In exemplary embodiments, reporting module 211 is configured to generate, in response to received requests, a report including the mobile device status for transmission to one or more administrative agencies, such as one or more predefined administrative agencies 127 stored to a user profile corresponding to the subscriber and/or lost, stolen, or otherwise misplaced mobile device 101. For instance, a subscriber may generate a user profile including one or more variables, values, parameters, polices, etc., for specifying one or more particular administrative agencies 127 that are to receive generated reports, such as one or more police departments within a predetermined vicinity of the environment surrounding mobile device 101, a manager of an organization responsible for the mobile device 101, etc. It is noted that generated reports may also include one or more of the captured signals and/or information received from mobile device 101. For instance, a report may include information tracking the spatial positioning of mobile device in real-time, such that the administrative agency 127 (or other authorized individuals or entities) can "chase after" mobile device 101. Such a scenario can be useful when mobile device 101 is stolen and the authorities (e.g., police) are dispatched to retrieve device 101 from the perpetrator(s). Thus, reporting module 211 via, for instance, communication interface 201, may be configured to transmit generated reports to these administrative agencies 127 over one or more of networks 109-115.

In order to provide selective access to the features and functionality of platform 200, platform 200 may also include an authentication module (not illustrated) for authenticating (or authorizing) users to platform 200. It is contemplated that the authentication module may operate in concert with communication interface 201 and/or user interface module 213. That is, the authentication module may verify user provided credential information acquired via communication interface 201 and/or user interface module 213 against corresponding credential information stored within a user profile of, for instance, user profiles repository 217. By way of example, the credential information may include "log on" information corresponding to a user name, password, coded key, or other unique identification parameter, such a personal identification number (PIN). In other instances, the credential information may include any one or combination of a birth date, an account number (e.g., bank, credit card, billing code, etc.), a social security number (SSN), an address (e.g., work, home, internet protocol (IP), media access control (MAC), port, etc.), or telephone listing (e.g., work, home, cellular, etc.), as well as any other form of uniquely identifiable datum, e.g., bearer tag identifier, biometric code, voice print, etc. Subscribers may provide this information via client devices 101, 105, and 107, such as by spoken utterances, dual-tone multi-frequency (DTMF) signals, packetized transmission, etc. It is contemplated that unobtrusive security may be provided by positively identifying and screening users based on one or more of the aforementioned credentials which may be seamlessly provided when client devices 101, 105, and 107 communicate with platform 200, such as a unique IP or MAC address. Other unobtrusive measures can be made available via voice prints, etc.

Additionally, platform 200 may include one or more controllers (or processors) 203 for effectuating the aforementioned features and functionality of the remote control and tracking services of system 100, as well as one or more memories 205 for permanent and/or temporary storage of one or more of the aforementioned variables, parameters, information, signals, etc. In this manner, the features and functionalities of remote application 121 may be executed by controller(s) 203 and/or memories 205, such as in conjunction with one or more of the various components of platform 200.

Figure 3:
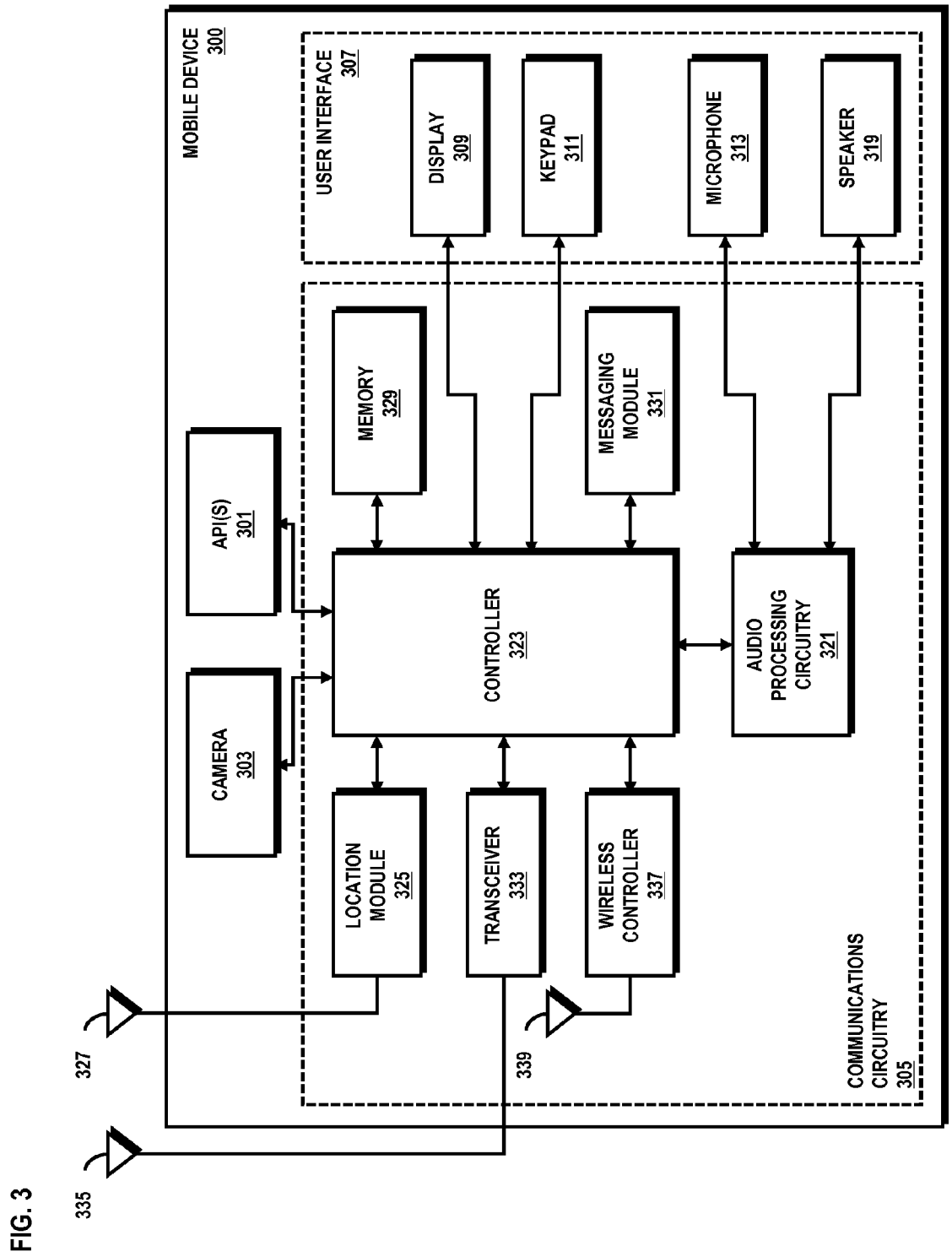
FIG. 3 is a diagram of a mobile device configured to facilitate remote control and tracking services, according to an exemplary embodiment.

FIG. 3 is a diagram of a mobile device configured to facilitate remote control and tracking services, according to an exemplary embodiment. Mobile device 300 may comprise computing hardware (such as described with respect to FIG. 10), as well as include one or more components configured to execute the processes described herein for facilitating the remote tracking services of system 100. In this example, mobile device 300 includes application programming interface(s) 301, camera 303, communications circuitry 305, and user interface 307. While specific reference will be made hereto, it is contemplated that mobile device 300 may embody many forms and include multiple and/or alternative components.

According to exemplary embodiments, user interface 305 may include one or more displays 309, keypads 311, microphones 313, and/or speakers 315. Display 309 provides a graphical user interface (GUI) that permits a user of mobile device 300 to view dialed digits, call status, menu options, and other service information. The GUI may include icons and menus, as well as other text and symbols. Keypad 309 includes an alphanumeric keypad and may represent other input controls, such as one or more button controls, dials, joysticks, touch panels, etc. The user thus can construct user profiles, enter commands, initialize applications, input remote addresses, select options from menu systems, and the like. Microphone 311 coverts spoken utterances of a user (or other auditory sounds, e.g., environmental sounds) into electronic audio signals, whereas speaker 313 converts audio signals into audible sounds.

Communications circuitry 305 may include audio processing circuitry 321, controller 323, location module 325 (such as a GPS receiver) coupled to antenna 327, memory 329, messaging module 331, transceiver 333 coupled to antenna 335, and wireless controller 337 coupled to antenna 339. Memory 329 may represent a hierarchy of memory, which may include both random access memory (RAM) and read-only memory (ROM). Computer program instructions and corresponding data for operation can be stored in non-volatile memory, such as erasable programmable read-only memory (EPROM), electrically erasable programmable read-only memory (EEPROM), and/or flash memory. Memory 329 may be implemented as one or more discrete devices, stacked devices, or integrated with controller 323. Memory 329 may store information, such as one or more user profiles, one or more user defined policies, one or more contact lists, personal information, sensitive information, work related information, etc.

Additionally, it is contemplated that mobile device 300 may also include one or more applications and, thereby, may store (via memory 329) data associated with these applications for providing users with browsing functions, business functions, calendar functions, communication functions, contact managing functions, data editing (e.g., database, word processing, spreadsheets, etc.) functions, financial functions, gaming functions, imaging functions, messaging (e.g., electronic mail, IM, MMS, SMS, etc.) functions, multimedia functions, service functions, storage functions, synchronization functions, task managing functions, querying functions, and the like. As such, control signals received by mobile device 300 from, for example, platform 103 may be utilized by API(s) 301 and/or controller 323 to facilitate remotely configuring, modifying, and/or utilizing one or more features, options, settings, etc., of these applications. It is also contemplated that these (or other) control signals may be utilized by controller 323 to facilitate remotely backing up and/or erasing data associated with these applications. In other instances, the control signals may cause mobile device 300 to become completely or partially deactivated or otherwise inoperable.

Accordingly, controller 323 controls the operation of mobile station 300, such as in response to commands received from API(s) 301 and/or data stored to memory 329. Control functions may be implemented in a single controller or via multiple controllers. Suitable controllers 323 may include, for example, both general purpose and special purpose controllers and digital signal processors. Controller 323 may interface with audio processing circuitry 321, which provides basic analog output signals to speaker 319 and receives analog audio inputs from microphone 313. In exemplary embodiments, controller 323 may be controlled by API(s) 301 in order to capture signals from camera 303 or microphone 313 in response to control signals received from platform 103. In other instances, controller 323 may be controlled by API(s) 301 to cause location module 325 to determine spatial positioning information corresponding to a location of mobile device 300. Still further, controller 323 may be controlled by API(s) 301 to image (e.g., backup) and/or erase memory 329, to configure (or reconfigure) functions of mobile device 300, to track and generate device usage logs, or to terminate services available to mobile device 300. It is noted that captured signals, device usage logs, memory images, spatial positioning information, and the like, may be transmitted to platform 103 via transceiver 333 and/or wireless controller 337. In this manner, the captured signals and/or other forms of information may be presented to users and stored to one or more networked storage locations, such as user profiles repository 117, tracking content repository 123, or any other suitable storage location or memory of (or accessible to) the components and facilities of system 100.

It is noted that real time spatial positioning information may be obtained or determined via location module 325 using, for instance, satellite positioning system technology, such as GPS technology. In this way, location module 325 can behave as (or substantially similar to) a GPS receiver. Thus, mobile device 300 employs location module 325 to communicate with constellation 125 of satellites. These satellites 125 transmit very low power interference and jamming resistant signals received by GPS receivers 325 via, for example, antennas 327. At any point on Earth, GPS receiver 325 can receive signals from multiple satellites, such as six to eleven. Specifically, GPS receiver 325 may determine three-dimensional geolocation (or spatial positioning information) from signals obtained from at least four satellites. Measurements from strategically positioned satellite tracking and monitoring stations are incorporated into orbital models for each satellite to compute precise orbital or clock data. Accordingly, GPS signals may be transmitted over two spread spectrum microwave carrier signals that can be shared by GPS satellites 125. Thus, if mobile device 300 is able to identify signals from at least four satellites 125, receivers 325 may decode the ephemeris and clock data, determine the pseudo range for each satellite 125 and, thereby, compute the spatial positioning of a receiving antenna 327. With GPS technology, mobile device 300 can determine its spatial position with great accuracy and convenience. It is contemplated, however, that location module 325 may utilize one or more other location determination technologies, such as advanced forward link triangulation (AFLT), angle of arrival (AOA), assisted GPS (A-GPS), cell identification (cell ID), observed time difference of arrival (OTDOA), enhanced observed time of difference (E-OTD), enhanced forward link trilateration (EFLT), network multipath analysis, and the like.

Mobile device 300 also includes messaging module 331 that is configured to receive, transmit, and/or process messages (e.g., EMS messages, SMS messages, MMS messages, IM messages, electronic mail messages, and/or any other suitable message) received from (or transmitted to) platform 103 or any other suitable component or facility of system 100. As previously mentioned, platform 103 may transmit control singles to mobile device 300 in the form of one or more API 301 directed messages, e.g., one or more BREW directed SMS messages. As such, messaging module 331 may be configured to identify such messages, as well as activate API(s) 301, in response thereto. Furthermore, messaging module 331 may be further configured to parse control signals from these messages and, thereby, port parsed control signals to corresponding components of mobile device 300, such as API(s) 301, controller 323, location module 325, memory 329, transceiver 333, wireless controller 337, etc., for implementation.

According to exemplary embodiments, API(s) 301 (once activated) is configured to effectuate the implementation of the control signals received from platform 103, e.g., from remote application 121. It is noted that the control signals are utilized by API(s) 301 to, for instance, remotely control, configure, monitor, track, and/or capture signals from (or related to) camera 103, communications circuitry 305, and/or user interface 307. In this manner, visual and/or acoustic indicia pertaining to an environment surrounding mobile device 300 may captured by API(s) 301 controlling camera 303 and microphone 313. Other control signals to cause mobile device 300 to determine spatial positioning information, to image and/or erase memory 329, to configure (or reconfigure) functions, to track and generate device usage logs, or to terminate services, may also be carried out via API(s) 301. As such, one or more signals captured from camera 303 or microphone 313, or device usage logs, memory images, spatial positioning information, etc., may be transmitted to platform 103 via transceiver 333 and/or wireless controller 337, in response to corresponding control signals provided to transceiver 333 and/or wireless controller 337 by API(s) 301. Thus, captured signals and/or one or more other forms of information provided to platform 103 may be presented to users and/or stored to one or more of user profiles repository 117 and tracking content repository 123, or any other suitable storage location or memory of (or accessible to) the components and facilities of system 100.

It is also noted that mobile device 300 can be equipped with wireless controller 337 to communicate with a wireless headset (not shown) or other wireless network. The headset can employ any number of standard radio technologies to communicate with wireless controller 337; for example, the headset can be BLUETOOTH enabled. It is contemplated that other equivalent short range radio technology and protocols can be utilized. While mobile device 300 has been described in accordance with the depicted embodiment of FIG. 3, it is contemplated that mobile device 300 may embody many forms and include multiple and/or alternative components.

Figure 4:
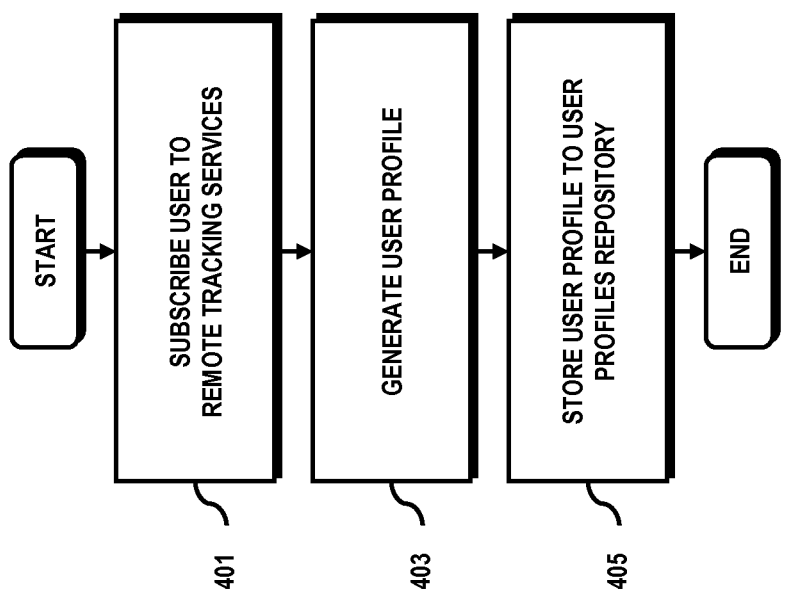
FIG. 4 is a flowchart of a process for subscribing a user to remote control and tracking services for mobile devices, according to an exemplary embodiment.

FIG. 4 is a flowchart of a process for subscribing a user to remote control and tracking services, according to an exemplary embodiment. For illustrative purposes, the process is described with respect to FIGS. 1 and 2. It is noted that the steps of the process may be performed in any suitable order, as well as combined or separated in any suitable manner. At step 401, platform 200 subscribes a user associated with one or more mobile devices (e.g., mobile device 101) to the remote control and tracking services of system 100. According to one embodiment, the user may subscribe utilizing any suitable client device capable of processing and transmitting information over one or more of networks 109-115, such as computing device 105. Namely, the user may interact with an input interface (e.g., a keyboard, interactive voice response (IVR) interface, etc.) of, for example, computing device 105 to activate software resident on device 105, such as a GUI or other networked application that interfaces with (or is implemented by) platform 200. Alternatively, the user may interact with a voice portal (not shown) interfacing with (or implemented by) platform 200, wherein speech synthesis and voice recognition techniques are utilized to prompt the user for various information and to reduce spoken utterances of the user and/or other signals (e.g., dual tone multi-frequency signals) associated with the user to one or more corresponding inputs. As such, the user can register as a new subscriber of the remote control and tracking services and may obtain sufficient authentication information for establishing future sessions with platform 200.

According to certain embodiments, registration procedures may prompt the user to identify mobile devices 101 and/or other client devices, e.g., client devices 105 and 107 that the user may wish to remotely control and/or track when, for instance, such devices become misplaced, lost, or even stolen. In this manner, the user may uniquely identify these devices 101, 105, and 107 by entering appropriate device information (or identifiers), such as one or more device types, serial numbers, registration numbers, MAC addresses, directory addresses, communications links, etc., corresponding to devices 101, 105, and 107. In certain exemplary embodiments, platform 200 may obtain corresponding configuration and/or interfacing information relating to these devices from, for example, one or more manufacturers or other third-party suppliers over, for instance, data network 109. It is noted that this configuration and/or interfacing information may be utilized by platform 200 to facilitate the remote control and tracking services of system 100. Furthermore, the configuration and/or interfacing information may be stored to any suitable storage location or memory of (or accessible to) system 100, such as user profiles repository 117.

Once registered (or as part of the registration process), platform 200 enables the user, per step 403, to generate and/or customize a user profile. The user profile may include addressing information (e.g., directory number, electronic serial number, international mobile equipment identifier, machine access control address, mobile directory number, mobile equipment identity, mobile identification number, internet protocol address, port address, and/or any other suitable address) corresponding to identified client devices 101, 105, and 107 that the user desires to register with the remote control and tracking services of system 100, as well as include other personal and/or service related information, parameters, polices, variables, etc., such as configuration and/or interfacing information, predetermined administrative agencies, and the like. At step 405, platform 200 stores the user to a list of subscribers to the remote control and tracking services of system 100, as well as stores the generated user profile, authentication information, device identifies, etc., to, for example, user profiles repository 117. It is noted that platform 200 may additionally (or alternatively) store or synchronize this user profile information to any suitable storage location or memory of (or accessible to) platform 200. Further, it is contemplated that users may directly interact with one or more of these storage facilities or memories, such as user profiles repository 117.

Figure 5A:
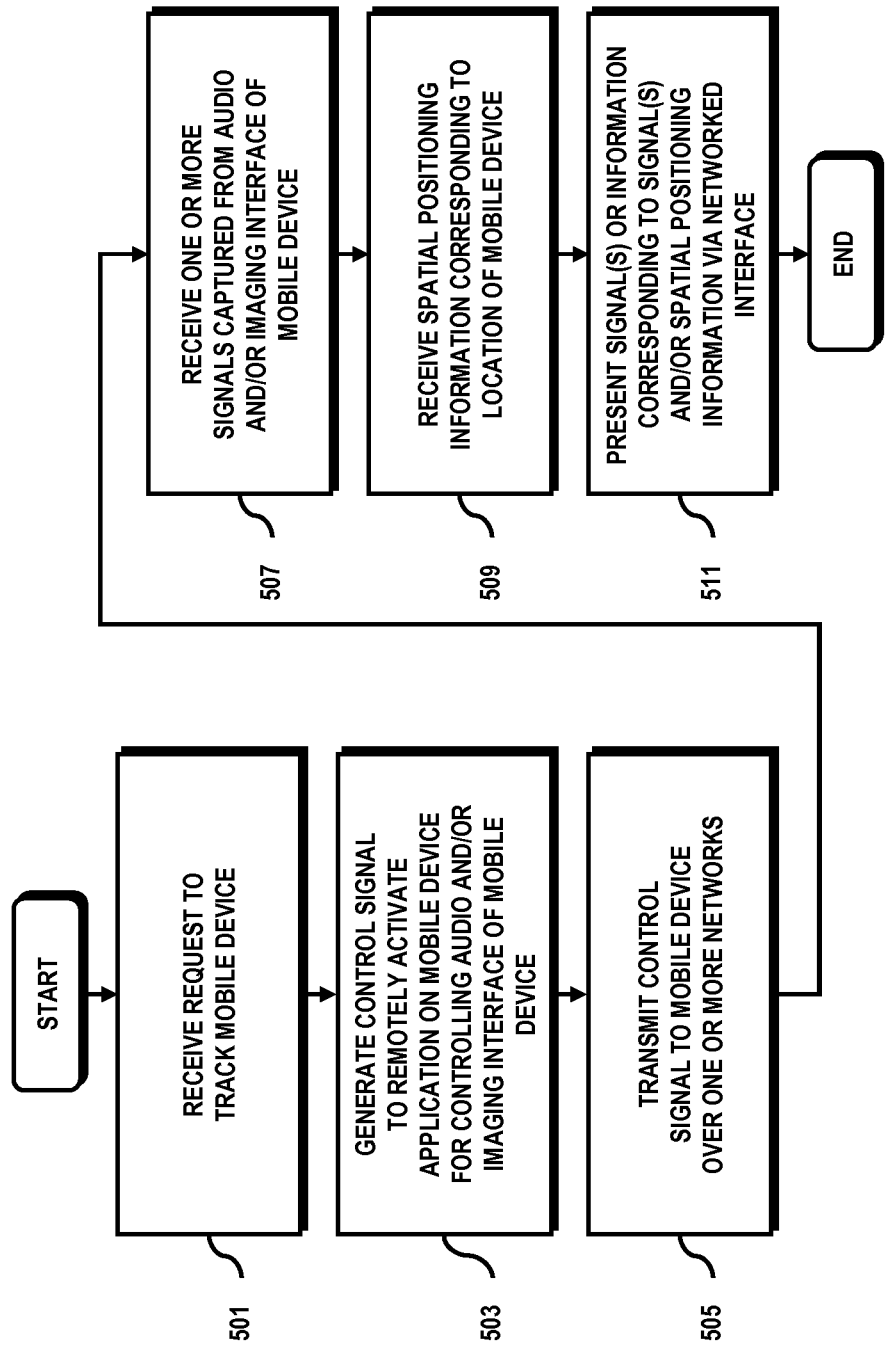
FIGS. 5A and 5B are flowcharts of processes for remotely tracking a mobile device, according to exemplary embodiments.
Figure 5B:
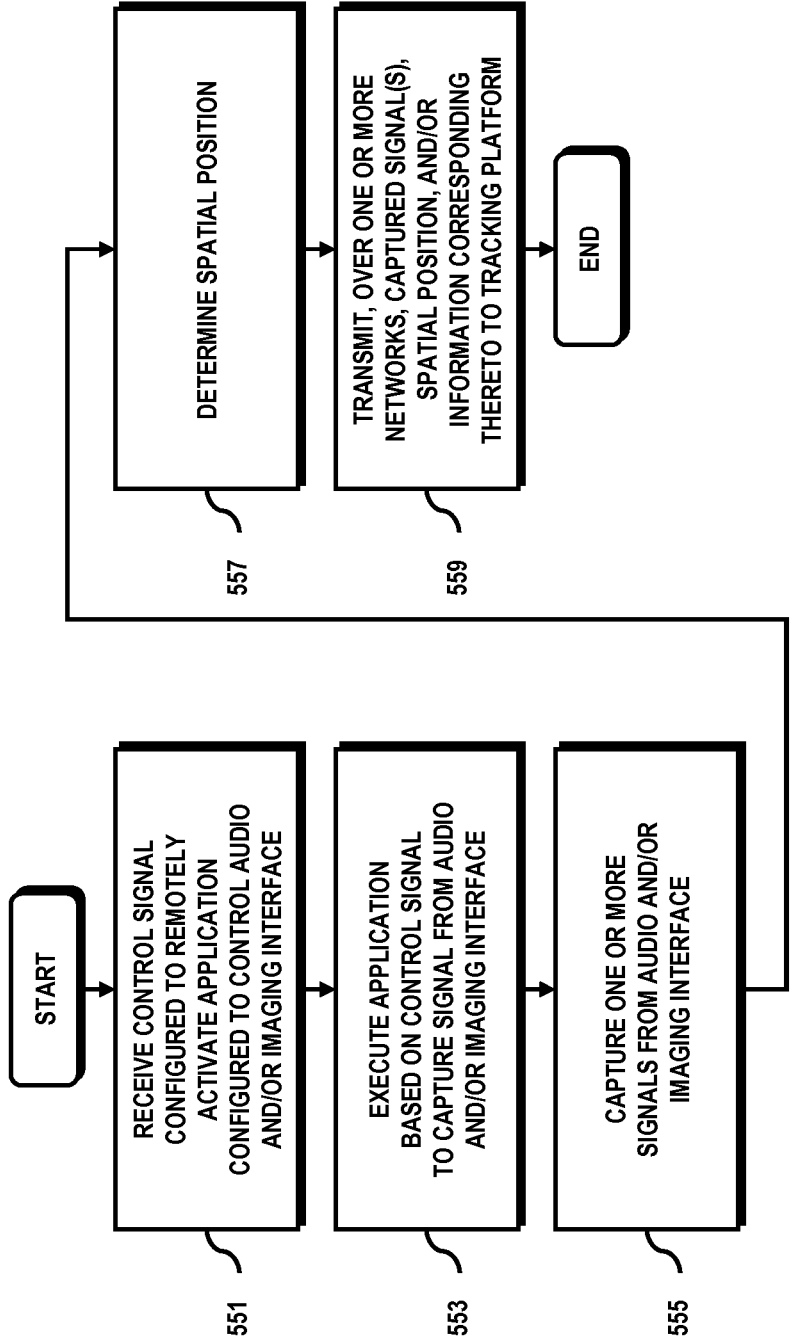

FIGS. 5A and 5B are flowcharts of processes for remotely tracking a mobile device, according to exemplary embodiments. For illustrative purposes, these processes are described with reference to FIGS. 1-3. It is also noted that the process involves, for example, mobile device 300 becoming misplaced, lost, or stolen. Further, the steps of the processes may be performed in any suitable order, as well as combined or separated in any suitable manner. In particular, FIG. 5A is utilized to describe these processes from the perspective of platform 200, whereas FIG. 5B is utilized to describe these process from the perspective of mobile device 300.

At step 501, platform 200 receives a request to track mobile device 300, which may be lost, stolen, or otherwise misplaced. That is, a subscriber via, for example, computing device 105 establishes a communication session with platform 200, such as by "logging on" to a networked application (e.g., remote application 121) provided by, for instance, user interface module 213. It is noted that before gaining access, the subscriber may be required to provide credential information, such as a username and password combination. Once "logged on," user interface module 213 may prompt the user with one or more GUIs menus, options, selections, etc., enabling the subscriber to formulate the request, as well as input an address (e.g., telephone number, machine identifier, media access control (MAC) address, internet protocol (IP) address, etc.) of mobile device 300 that the user wants to remotely track.

In step 503, user interface module 213 ports the request to, for instance, messaging module 207 to generate one or more control signals to remotely activate an application (e.g., API(s) 301, on mobile device 300 for controlling an audio interface (e.g., microphone 313) or an imaging interface (e.g., camera 303) of mobile device 300. As previously mentioned, messaging module 207 may be configured to generate control signals for transmission to mobile device 300 utilizing via various bearers, such as in the form of one or more call control setup messages, short messaging service (SMS) messages, enhanced messaging service (EMS) messages, multimedia messaging service (MMS) messages, electronic mail, files, or any other suitable bearer, as well as any suitable combination thereof. These messages may further be directed to API(s) 301, such as one or more BREW directed SMS messages. Thus, at step 505, messaging module 207 via, for example, communication interface 201, transmits the one or more generated control signals (e.g., the one or more BREW directed SMS messages) to mobile device 300 over one or more of networks 109-115 and, in particular, via wireless network 115.

At step 507, communication interface 201 receives one or more signals captured from the audio interface or the imaging interface of mobile device 300 that, in exemplary embodiments, correspond to acoustic and/or visual indicia of an environment surrounding mobile device 300. Further, per step 509, communication interface 201 may also receive spatial positioning information corresponding to a location of mobile device 300. It is noted that the captured signals and/or spatial positioning information may be stored to tracking content repository 123 or any other suitable storage location of (or accessible to) system 100, such as user profiles repository 117. Accordingly, at step 511, user interface module 213 presents the captured signals (or information corresponding to these signal(s)) and/or the spatial positioning information via the networked interface, e.g., via one or more GUIs implemented by user interface module 213.

Referring now to FIG. 5B, mobile device 300 via, for instance, transceiver 333 receives one or more control signals configured to remotely activate an application (e.g., one or more of API(s) 301) configured to control an audio interface (e.g., microphone 313) or an imaging interface (e.g., camera 303) of mobile device 300. In exemplary embodiments, the control signals may be couched in one or more call control setup messages, short messaging service (SMS) messages, enhanced messaging service (EMS) messages, multimedia messaging service (MMS) messages, electronic mail, files, or any other suitable bearer, as well as any suitable combination thereof. Accordingly, transceiver 333 may port received messages to messaging module 331 for identifying the messages as remote control signals, as well as parsing received messages for corresponding control signals. In this manner, messaging module 331 ports the control signals to API(s) 301, which remotely activate API(s) 301 for executing one or more applications to capture one or more signals from the audio interface or the imaging interface of mobile device 300, per step 553. At step 555, API(s) 301 control the audio interface or the imaging interface to capture one or more signals that, in exemplary embodiments, pertain to acoustic and/or visual indicia of an environment surrounding mobile device 300. According to certain embodiments, API(s) 301 may also provide suitable control signals to location module 325 to determine, per step 557, spatial positioning information corresponding to a location of mobile device 300. Thus, in step 559, mobile device 300 via, for instance, transceiver 333, transmits the captured signals and/or the spatial positioning information to platform 200, such as over one or more of networks 109-115. It is noted that this spatial positioning information and/or the captured signals, when presented to a subscriber, will facilitate the subscriber's efforts in locating and recovering mobile device 300 or identifying a potential perpetrator who may have stolen mobile device 300 from the subscriber.

Figure 6:
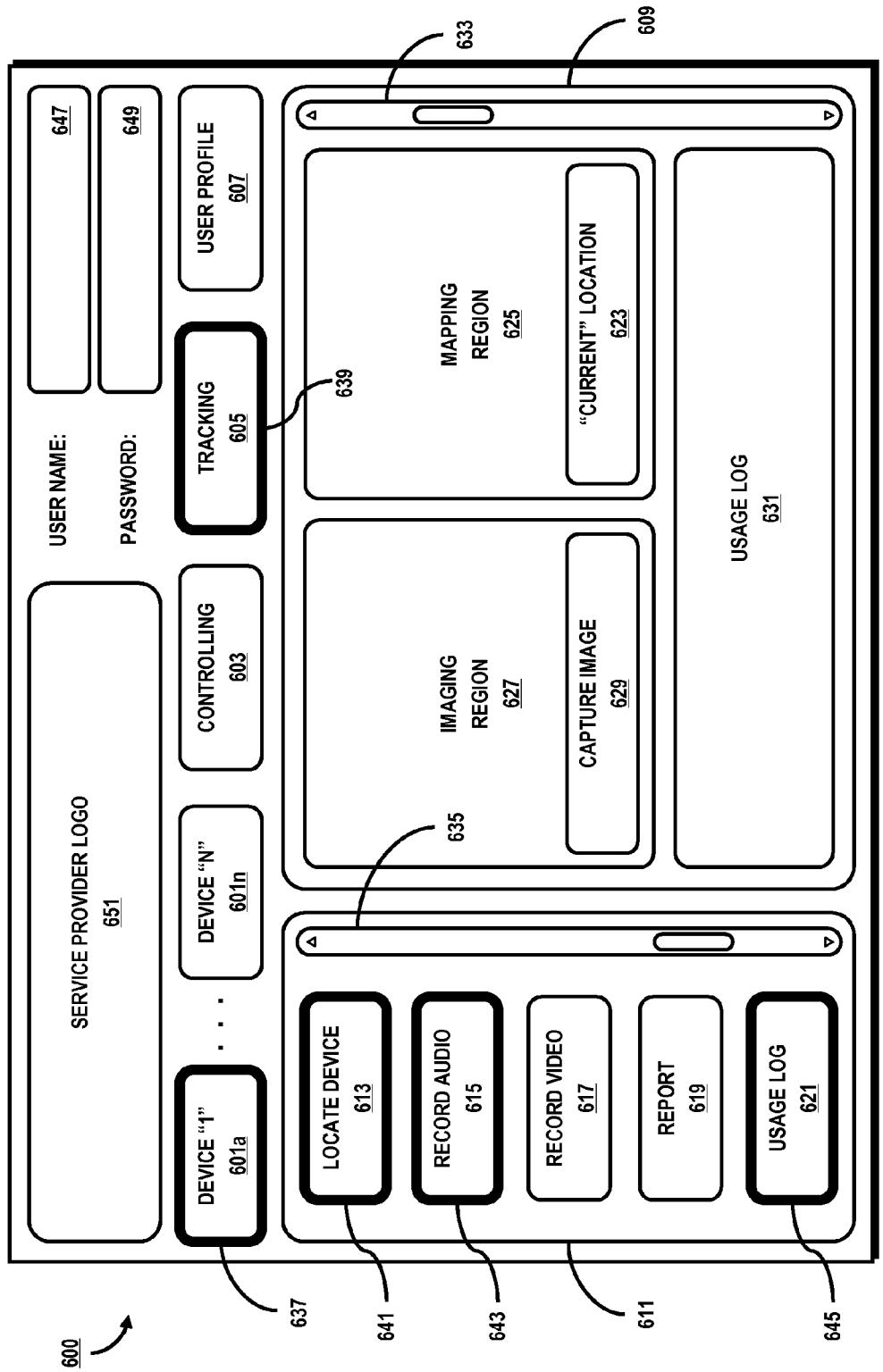
FIG. 6 is a graphical user interface for remotely tracking a mobile device, according to an exemplary embodiment.

FIG. 6 is a graphical user interface for remotely tracking a mobile device, according to an exemplary embodiment. In this example, it is assumed that GUI 600 is provided to a subscriber of the remote control and tracking services of system 100 by platform 200 via, for instance, user interface module 213. It is also assumed that the subscriber has registered a plurality of devices, such as a plurality of mobile devices 101, with the remote control and tracking services of system 100. Hence, GUI 600 includes a plurality of "tabs" (or interactive interface elements) 601a-601n corresponding to registered devices of (or associated with) the subscriber. A plurality of other tabs, e.g., "CONTROLLING" tab 603, "TRACKING" tab 605, and "USER PROFILE" tab 607 provides the subscriber with various "main" remote controlling and tracking features or functionalities of platform 200. For instance, tab 603 enables the subscriber to remotely control devices associated with the user, such as for backing up or erasing a memory, configuring (or reconfiguring) functions, terminating services, etc., of or associated with registered devices. Tab 605 enables subscribers to capture signals from an interface (e.g., audio interface, imaging interface, etc.) of registered devices, as well as obtain spatial positioning information corresponding to a location of registered devices. Tab 607 enables subscribers to modify corresponding user profile information, such as register new devices to the remote control and tracking services of system 100, update personal information, and the like.

Accordingly, selection of (or any other suitable interaction with) tab 605 toggles region 609 to an "active" tracking region 609, providing tracking content associated with a particular device. For instance, selection of a particular one of tabs 601a-601n toggles "active" tracking region 609 between tracking "DEVICE '1,'" DEVICE '2,'" . . . "DEVICE 'N.'" That is, selection of, for example, tab 601a toggles "active" tracking region 609 to present tracking content corresponding to "DEVICE '1.'" It may also be the case that interacting with tracking tab 605 causes a feature (or function) of region 611 to be populated with one or more "available" tracking features region 611 providing one or more available remote control and/or tracking features to the subscriber, such as a "LOCATE DEVICE" feature 613, a "RECORD AUDIO" feature 615, a "RECORD VIDEO" feature 617, a "REPORT" feature 619, a "USAGE LOG" feature 621, etc. In other embodiments, features region 611 may include a navigation tree, an expandable table of contents, or for example Flash-Media presentation of selectable entries, as well as other equivalent listings, menus, options, etc. The content of respective regions (e.g., regions 609 and 611) may be dynamically updated based on one or more selections of features 613-621.

Accordingly, selection of feature 613 provides spatial positioning information (e.g., a "current" location) of the device being tracked, which in this example is "DEVICE '1.'" As such, a "'CURRENT' LOCATION" region 623 may be provided for presenting the subscriber with various forms of spatial positioning information, such as a street address, latitude, longitude, elevation, etc., as well combinations thereof. According to particular embodiments, a "MAPPING" region 625 may be provided that overlays the spatial positioning information on, for instance, a topological depiction of a geographic area surrounding the location of the device, which may also be appended with various cartographic features, such as buildings, landmarks, roadways, signs, and the like. In certain embodiments, the overlay may be a point-of-interest (POI) marker, such that the subscriber may obtain directions to the location of the device via interaction with the POI marker.

Selection of feature 615 enables the subscriber to record audio (or acoustics) captured from an audio interface (e.g., microphone 313) of mobile device 300. This acoustic information may be presented to the user via suitable transducers of a client device (e.g., computing device 105) interfacing with GUI 600. In a similar fashion, selection of feature 617 enables the subscriber to record video captured from, for instance, an imaging interface (e.g., camera 303) of mobile device 300. Accordingly, an "IMAGING" region 627 may be provide for displaying the capture video to the subscriber. Further, interaction with, for instance, a "CAPTURE IMAGE" button 629 allows the subscriber to "take" still images of visual indicia captured via the imaging interface of mobile device 300.

According to particular embodiments, selection of feature 621 enables the subscriber to obtain device usage information (e.g., statistics, summary, descriptions, etc.) pertaining to the use of various features, applications, services, etc., of (or available to) a device being tracked. Accordingly, a "USAGE LOG" region 631 may be provided to display usage information to the subscriber. Moreover, selection of feature 619, allows the subscriber to report a status and/or tracking information of the device being actively tracked to an administrative agency.

Navigational elements/fields, e.g., scrollbars 633 and 635, may be provided and configured to indicate the existence of additional information, entries, fields, etc., not displayed, but navigably available, as well as facilitate interface usability. Accordingly, the subscriber may browse to additional information, entries, fields, etc., via, for instance, an input interface of a suitable client device (e.g., computing device 105), e.g., a cursor control. One or more fixed focus states (e.g., borders 637, 639, 641, 643, and 645) and/or distinctive magnification features, e.g., color, brightness, bolding, font type, text size, etc., may be used to convey the device being "currently" tracked, as well as those remote control and/or tracking features being "currently" employed to remotely control and/or track the particular device.

According to additional exemplary embodiments, GUI 600 may include various other regions, such as a user name region 647 and a password region 649 for enabling subscribers to "log on" and obtain access to the features and functionalities of GUI 600 and/or platform 200. In alternative embodiments, regions 647 and 649 may be configured to correspond to other associated authentication information. It is noted that a "WELCOME, USERNAME" message may be presented to authenticated subscribers once sufficient authentication (or authorization) information is input to regions 647 and/or 649. Still further, GUI 600 may include a service provider logo region 651 to illustrate (or otherwise present) the subscriber with a logo of the service provider of the remote control and tracking services of system 100, as well as include other suitable (or equivalent) regions, such as an advertisement region (not shown), etc.

Figure 7A:
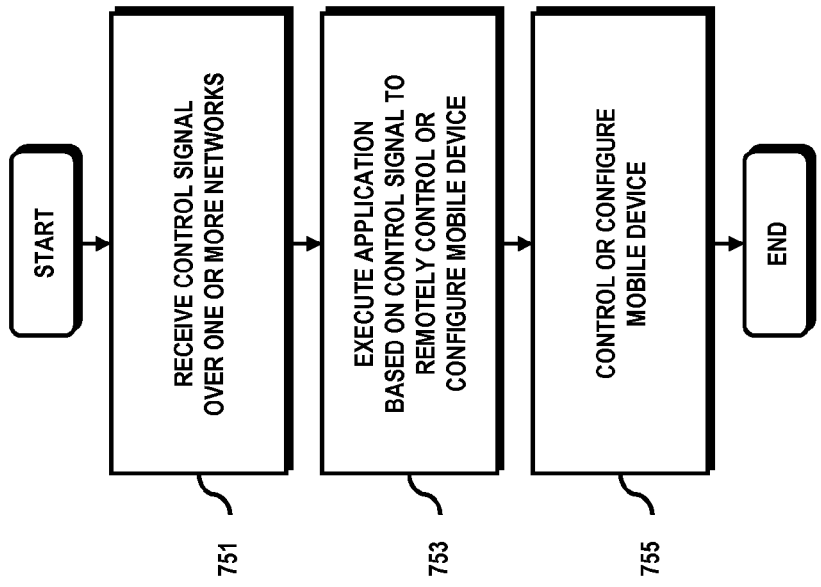
FIGS. 7A and 7B are flowcharts of processes for remotely controlling or configuring a mobile device, according to exemplary embodiments.
Figure 7B:
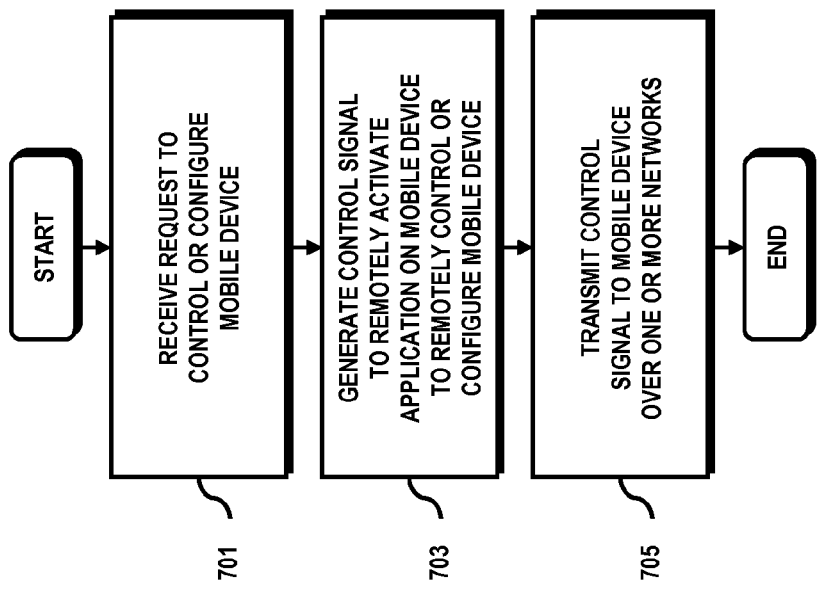

FIGS. 7A and 7B are flowcharts of processes for remotely controlling or configuring a mobile device, according to exemplary embodiments. For illustrative purposes, the process is described with reference to FIGS. 1-3. It is also noted that the process involves, for example, mobile device 300 becoming misplaced, lost, or stolen. In particular, FIG. 7A is utilized to describe these processes from the perspective of platform 200, whereas FIG. 7B is utilized to describe these process from the perspective of mobile device 300.

At step 701, a subscriber (e.g., owner) of mobile device 300 accesses platform 200 via, for instance, computing device 105 in order to remotely control or configure mobile device 300, such as for imaging and/or erasing memory 329, configuring (or reconfiguring) one or more functions associated with applications or settings of mobile device 300, obtaining usage logs pertaining to the use of mobile device 300, or terminating services, etc., of or associated with mobile device 300. That is, a subscriber via, for example, computing device 105 establishes a communication session with platform 200, such as by "logging on" to a networked application (e.g., remote application 121) provided by, for instance, user interface module 213, to submit a request to remotely control or configured mobile device 300. It is noted that before gaining access, the subscriber may be required to provide credential information, such as a username and password combination. Once "logged on," user interface module 213 may prompt the user with one or more GUIs menus, options, selections, etc., enabling the subscriber to formulate the request, as well as input an address (e.g., telephone number, machine identifier, media access control (MAC) address, internet protocol (IP) address, etc.) of mobile device 300 that the user wants to remotely control and/or configure. It is noted that an exemplary GUI for remotely controlling and/or configured mobile device 300 is described in more detail in accordance with FIG. 8.

In step 703, user interface module 213 ports the request to, for instance, messaging module 207 to generate one or more control signals to remotely activate an application (e.g., API(s) 301, on mobile device 300 for imaging and/or erasing memory 329, configuring (or reconfiguring) one or more functions associated with applications or settings of mobile device 300, obtaining usage logs pertaining to the use of mobile device 300, or terminating services, etc., of or associated with mobile device 300. As previously mentioned, messaging module 207 may be configured to generate control signals for transmission to mobile device 300 utilizing via various bearers, such as in the form of one or more call control setup messages, short messaging service (SMS) messages, enhanced messaging service (EMS) messages, multimedia messaging service (MMS) messages, electronic mail, files, or any other suitable bearer, as well as any suitable combination thereof. These messages may further be directed to API(s) 301, such as one or more BREW directed SMS messages. Thus, at step 705, messaging module 207 via, for example, communication interface 201, transmits the one or more generated control signals (e.g., the one or more BREW directed SMS messages) to mobile device 300 over one or more of networks 109-115 and, in particular, via wireless network 115. Even though not illustrated, when the user employs the process of FIG. 7A to obtain usage log information, image memory 329, etc., corresponding information may be received by communication interface 201, in response to, transmitting the control signals to mobile device 300, such as in the process of FIG. 5A.

Referring now to FIG. 7B, mobile device 300 via, for instance, transceiver 333 receives one or more control signals configured to remotely activate an application (e.g., one or more of API(s) 301) configured to remotely control or configure mobile device 300, such as for imaging and/or erasing memory 329, configuring (or reconfiguring) one or more functions associated with applications or settings of mobile device 300, obtaining usage logs pertaining to the use of mobile device 300, or terminating services, etc., of or associated with mobile device 300. In exemplary embodiments, the control signals may be couched in one or more call control setup messages, short messaging service (SMS) messages, enhanced messaging service (EMS) messages, multimedia messaging service (MMS) messages, electronic mail, files, or any other suitable bearer, as well as any suitable combination thereof. Accordingly, transceiver 333 may port received messages to messaging module 331 for identifying the messages as remote control signals, as well as parsing received messages for corresponding control signals. In this manner, messaging module 331 will port parsed control signals to API(s) 301, which remotely activate API(s) 301 for executing, in step 753, one or more applications to image and/or erase memory 329, configure (or reconfigure) one or more functions associated with applications or settings of mobile device 300, obtain usage logs pertaining to the use of mobile device 300, or terminate services, etc., of or associated with mobile device 300. At step 755, API(s) 301 control corresponding components of mobile device 300, such as memory 329, location module 325, transceiver 333, etc., to carry out the commands, instructions, processes, etc., delineated within the received control signals to control or configure mobile device 300. Even though not illustrated, mobile device is remotely controlled to obtain usage log information, image memory 329, etc., corresponding information may be transmitted to platform 200 via transceiver 333, such as in the process of FIG. 5B.

Figure 8:
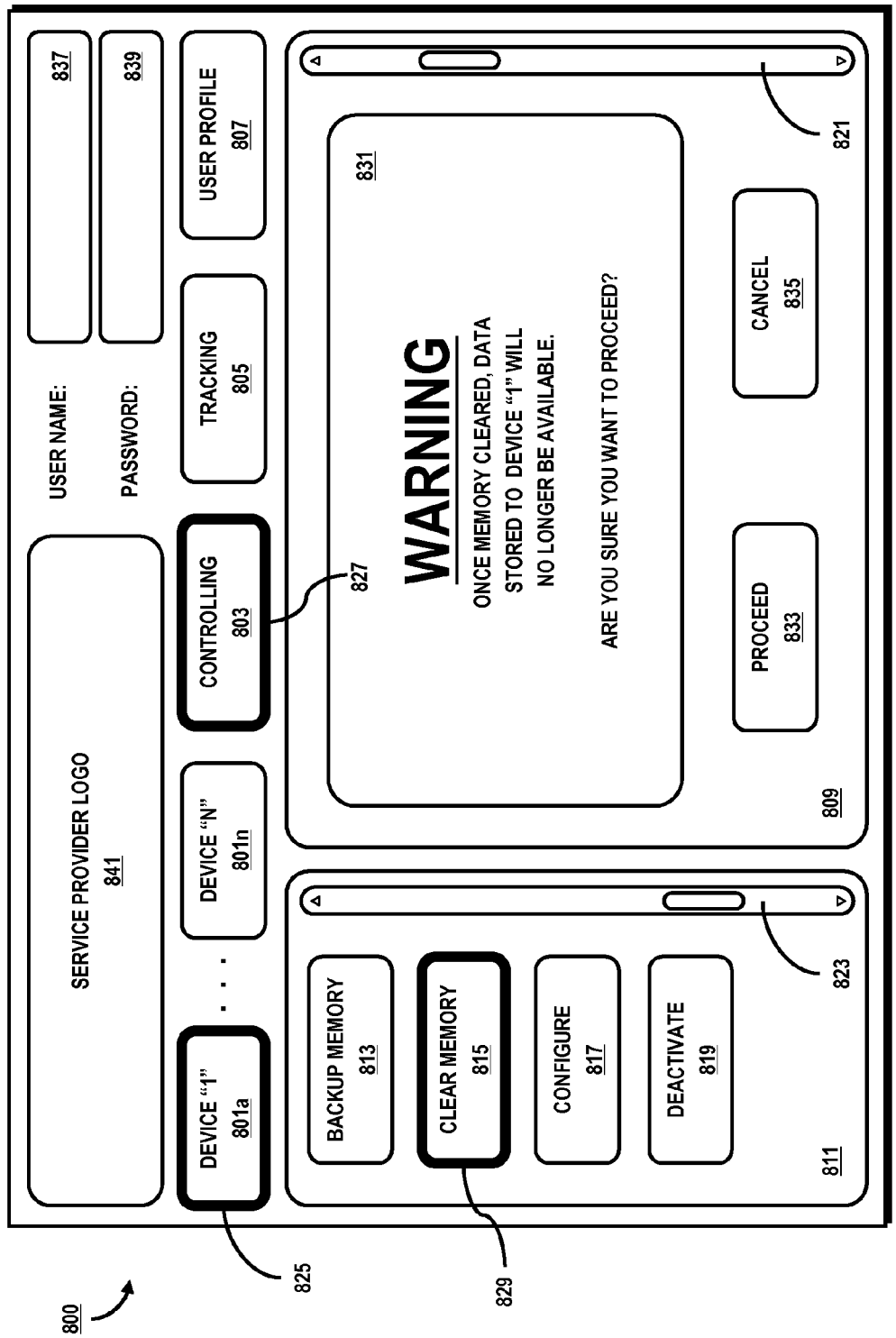
FIG. 8 is a graphical user interface for remotely controlling or configuring a mobile device, according to an exemplary embodiment.

FIG. 8 is a graphical user interface for remotely controlling or configuring a mobile device, according to an exemplary embodiment. In this example, GUI 800 is provided to a subscriber of the remote control and tracking services of system 100 by platform 200 via, for instance, user interface module 213. It is assumed that the subscriber has previously registered one or more devices, e.g., devices 101, with the remote control and tracking services of system 100. Hence, GUI 800, like GUI 600, includes a plurality of "tabs" (or interactive interface elements) 801a-801n corresponding to registered devices of (or associated with) the subscriber. Further, main feature tabs, e.g., "CONTROLLING" tab 803, "TRACKING" tab 805, and "USER PROFILE" tab 807 are provided for accessing the "main" remote controlling and tracking features or functionalities of platform 200. Tabs 803-807 correspond to tabs 603-607 and, therefore, are not explained in any further detail.

Accordingly, selection of (or any other suitable interaction with) controlling tab 803 toggles region 809 to an "active" controlling region 809, providing a control feature or function associated with a particular device. For instance, selection of (or any other suitable interaction with) a particular one of tabs 801a-801n toggles "active" control region 809 between controlling "DEVICE '1,'" DEVICE '2,'" . . . "DEVICE 'N.'" That is, selection of, for example, tab 801a toggles "active" controlling region 809 to present a control feature or function capable of being configured for "DEVICE '1.'" It may also be the case that interacting with controlling tab 803 causes a features (or functions) region 811 to be populated with one or more "available" control features region 611 providing one or more available remote control and/or tracking features to the subscriber, such as a "BACKUP MEMORY" feature 813, a "CLEAR MEMORY" feature 815, a "CONFIGURE" feature 817, a "DEACTIVATE" feature 819, etc. In other embodiments, features region 811 may include a navigation tree, an expandable table of contents, or for example FlashMedia presentation of selectable entries, as well as other equivalent listings, menus, options, etc. The content of respective regions (e.g., regions 809 and 811) may be dynamically updated based on one or more selections of features 813-819.

Accordingly, selection of feature 813 enables the subscriber to image or back up one or more memories (e.g., memory 329) of mobile device 300, whereas selection of feature 815 allows the subscriber to clear the one or more memories, such as to purge the device of sensitive or otherwise personal information. Interaction with feature 817 enables the subscriber to configure one or more features or functions of the actively controlled device, such as configuring a ringtone, operating state, display setting, etc., of mobile device 300. Furthermore, selection of feature 819 enables the user to "lock" the device being remotely controlled until an appropriate "unlock" code (or signal) is input (or transmitted) to the device. In other instances, feature 819 may permanently terminate usage of the device being controlled, such as an "autodestruct" feature or a service termination feature.

Similarly to GUI 600, GUI 800 provides navigational elements/fields, e.g., scrollbars 821 and 823, to indicate the existence of additional information, entries, fields, etc., not displayed, but navigably available, as well as facilitate interface usability. Accordingly, the subscriber may browse to additional information, entries, fields, etc., via, for instance, an input interface of a suitable client device (e.g., computing device 105), e.g., a cursor control. One or more fixed focus states (e.g., borders 825, 827, and 829) and/or distinctive magnification features, e.g., color, brightness, bolding, font type, text size, etc., may be used to convey the device being "currently" controlled, as well as those remote control and/or tracking features being "currently" employed to remotely control and/or track the particular device.

As seen in FIG. 8, feature 815 has been selected, which is denoted by fixed focus state 829. Accordingly, controlling region 809 provides one or more menus, options, instructions, buttons, etc., for clearing (or otherwise erasing) a memory of the device being currently controlled. For instance, region 809 provides an instruction region 831 informing the subscriber that once the memory of the device is erased, the information will no longer be available. As such, interaction with interactive element 833 carries out the erasing function and, thereby, purges the device being controlled of all personal and/or sensitive information, whereas interaction with interactive element 835 cancels the clear memory feature. Similar instruction regions, interactive elements, input fields, etc., may be provided for features 813, 817, and 819.

Moreover, like GUI 600, GUI 800 also includes various regions, such as a user name region 837 and a password region 839 for enabling subscribers to "log on" and obtain access to the features and functionalities of GUI 800 and/or platform 200. In alternative embodiments, regions 837 and 839 may be configured to correspond to other associated authentication information. It is noted that a "WELCOME, USERNAME" message may be presented to authenticated subscribers once sufficient authentication (or authorization) information is input to regions 837 and/or 839. Still further, GUI 800 may include a service provider logo region 841 to illustrate (or otherwise present) the subscriber with a logo of the service provider of the remote control and tracking services of system 100, as well as include other suitable (or equivalent) regions, such as an advertisement region (not shown), etc.

Figure 9:
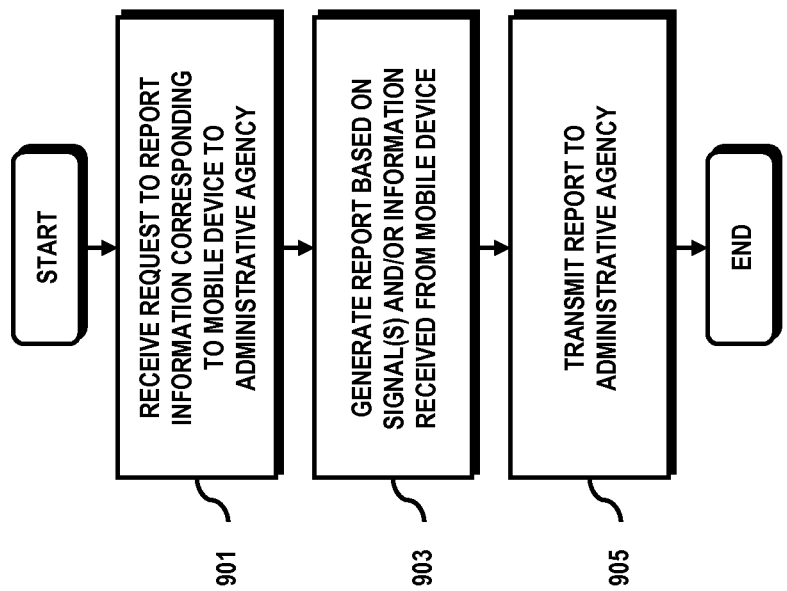
FIG. 9 is a flowchart of a process for providing tracking information related to a mobile device to an administrative agency, according to an exemplary embodiment.

FIG. 9 is a flowchart of a process for providing tracking information related to a mobile device to an administrative agency, according to an exemplary embodiment. For illustrative purposes, the process is described with reference to FIGS. 1, 2, and 6. In this example, it is assumed that mobile device 300, associated with a subscriber, has been stolen and that the user wants to report the device as stolen and/or provide tracking information to an administrative agency, such as a local police department, in order to facilitate the recovery of the device and apprehending potential perpetrators. Further, is noted that the steps of the process may be performed in any suitable order, as well as combined or separated in any suitable manner.

At step 901, user interface module 213 of tracking platform 200 receives a request to report information corresponding to mobile device to an administrative agency, e.g., report that mobile device 300 is stolen and provide the administrative agency with related tracking information (or content), such as acoustics, visuals, and spatial positioning information corresponding to an environment surrounding mobile device 300. For instance, the user may have discovered that their mobile device 300 was stolen, accessed tracking platform 200 via, for instance, computing device 105, and interacted with one or more of tabs 601-607 and/or 613-621 of GUI 600, which enables the user to remotely control and track mobile device 300, as well as request a report be transmitted to a particular administrative agency, e.g., local police department, based on information received from the device. For example, the user may select "REPORT" feature 619 for providing a report to the administrative agency.

In this manner, user interface module 213 may port the request to, for instance, reporting module 211 so that reporting module 211 can generate, per step 903, a report based on the request and one or more captured signals and/or information (e.g., spatial positioning information, usage log information, acoustics, visuals, etc.) received from mobile device 300, such as in accordance with the process of FIGS. 5A and/or 7A. According to various exemplary embodiments, the report may provide the location (or spatial position) of mobile device 300, as well as provide a depiction corresponding to a "current" location of device 300, e.g., provide a map with a point of interest corresponding to the spatial position of the device within a geographic region. The report may also provide one or more images, usage log information, textual descriptions, etc., of an environment surrounding mobile device 300. According to certain embodiments, the report may be generated to include (or be accompanied by) video and/or audio captured via an audio interface or imaging interface of device 300, such as audio captured via microphone 313 and video captured via camera 301 of mobile device 300. As such, the information provided in the report may pertain to the location of the stolen device, the surrounding environment of the stolen device, and potentially a perpetrator making use of or otherwise possessing the stolen device. Thus, per step 905, reporting module 211 via, for instance, communication interface 201 transmits the generated report to the administrative agency, which may be selected by reporting module 211 based on information retrieved from user profiles repository 117 or one or more commands input to user interface module 213 by the subscriber. It is also noted that reporting module 211 may provide the subscriber with a copy (or instance) of the report, as well. In this way, the remote control and tracking services of system 100 enables users to seamlessly report to an administrative agency when, for instance, their mobile devices 101 become misplaced, lost, or even stolen, as well as provide administrative agencies (and/or subscribers) with various information, attributes, etc., related to the devices 101, such as the location and/or environment surrounding the device that facilitates the recovery of the devices 101 and/or apprehend potential perpetrators.

The processes described herein for providing remote control and tracking services for mobile devices may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
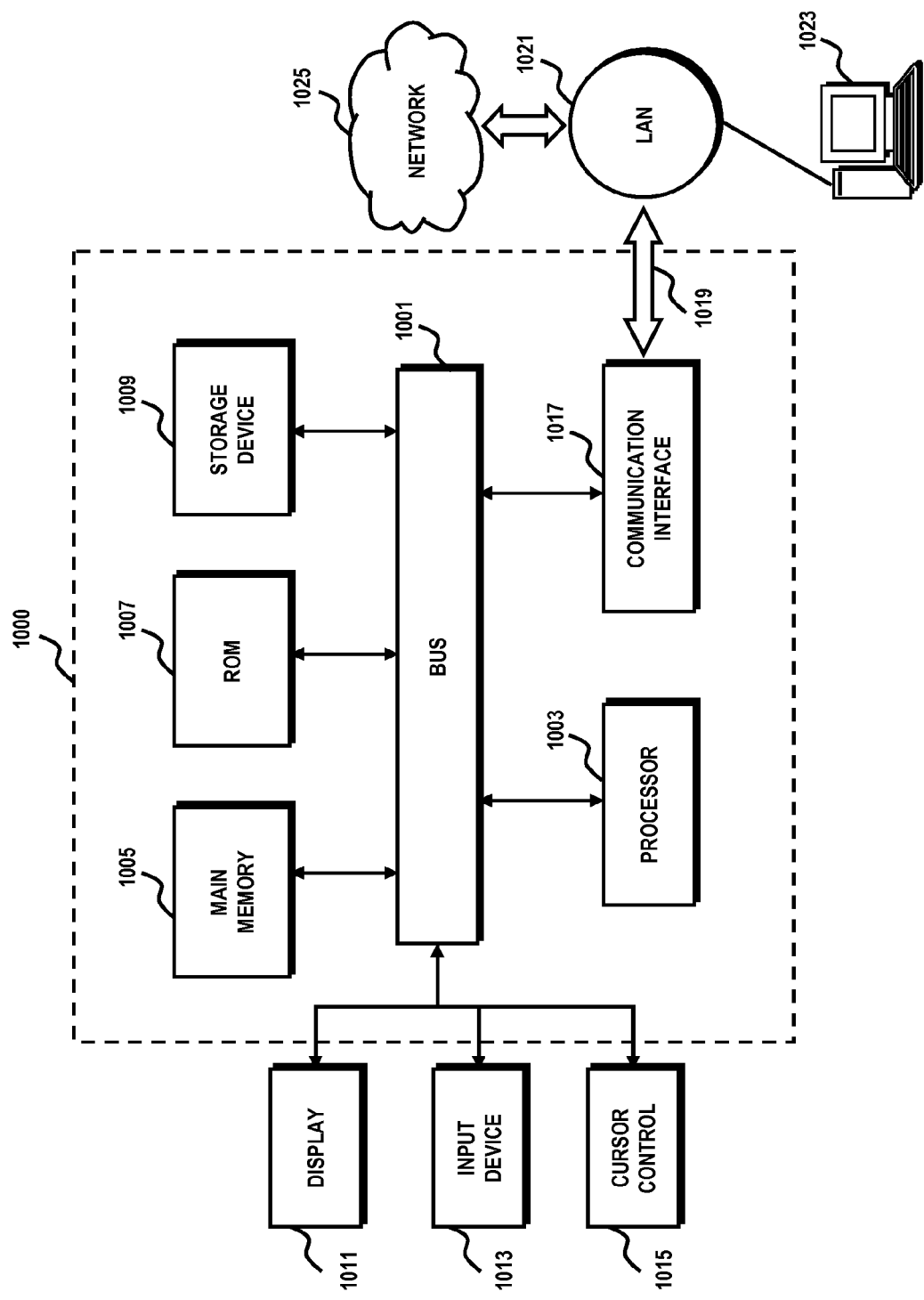
FIG. 10 is a diagram of a computer system that can be used to implement various exemplary embodiments.

FIG. 10 illustrates computing hardware (e.g., computer system) 1000 upon which exemplary embodiments can be implemented. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to an exemplary embodiment, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement exemplary embodiments. Thus, exemplary embodiments are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an exemplary embodiment through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    receiving a request from a user of a mobile device to track the mobile device;
    generating, in response to the request, a control signal to remotely activate an application on the mobile device for controlling an audio interface or an imaging interface of the mobile device to capture a signal from the audio interface or the imaging interface;
    receiving one or more signals captured from the audio interface or the imaging interface of the mobile device;
    determining to present the received one or more signals captured from the audio interface or the imaging interface of the mobile device to the user of the mobile device via a user communication interface;
    receiving another request from the user of the mobile device to deactivate the mobile device based on the one or more signals captured from the audio interface or the imaging interface of the mobile device that are presented to the user of the mobile device via the user communication interface;
    generating another control signal, wherein the other control signal at least causes a memory of the mobile device to be erased;
    determining to transmit the other control signal to the mobile device;
    receiving an image of the memory before the memory is erased in response to the other control signal; and
    storing the image to a networked repository.

2. The method according to claim 1, further comprising:
    transmitting the control signal to the mobile device over a wireless network as part of a short messaging service message.

3. The method according to claim 1, further comprising:
    receiving, from the application, spatial positioning information corresponding to a location of the mobile device.

4. The method according to claim 1, wherein the audio interface corresponds to a microphone, the imaging interface corresponds to a camera, and the signal relates to acoustics or one or more images of an environment of the mobile device.

5. The method according to claim 1, further comprising:
    receiving the signal over a wireless network; and
    presenting the signal or information corresponding to the signal via a networked interface.

6. The method according to claim 1, further comprising:
    monitoring transmissions associated with the mobile device; and
    storing information corresponding to the transmissions to a networked repository.

7. The method according to claim 1, further comprising:
    receiving another request to transmit the signal or information corresponding to the signal to an administrative agency;
    generating a report including the signal or the information; and
    transmitting the report to the administrative agency.

8. An apparatus comprising:
    a communication interface configured to receive a request from a user of a mobile device to track the mobile device; and
    a processor configured to generate, in response to the request, a control signal to remotely activate an application on the mobile device for controlling an audio interface or an imaging interface of the mobile device to capture a signal from the audio interface or the imaging interface,
    wherein the communication interface is further configured to:
    receive one or more signals captured from the audio interface or the imaging interface of the mobile device;
    determine to present the received one or more signals captured from the audio interface or the imaging interface of the mobile device to the user of the mobile device via the communication interface;
    receiving another request from the user of the mobile device to deactivate the mobile device base on the one or more signals captured from the audio interface or the imaging interface of the mobile device that are presented to the user of the mobile device via the communication interface; and the processor is further configured to:

generate another control signal, the other control signal being configured to at least cause a memory of the mobile device to be erased, determine to transmit the other control signal to the mobile device, and receive an image of the memory before the memory is erased in response to the other control signal and store the image to a networked repository.

9. The apparatus according to claim 8, wherein the communication interface is further configured to transmit the control signal to the mobile device over a wireless network as part of a short messaging service message.

10. The apparatus according to claim 8, wherein the communication interface is further configured to receive, from the application, spatial positioning information corresponding to a location of the mobile device.

11. The apparatus according to claim 8, wherein the communication interface is further configured to receive the signal over a wireless network and the processor is further configured to present the signal or information corresponding to the signal via a networked interface.

12. The apparatus according to claim 8, further comprising:

a module configured to monitor transmissions associated with the mobile device and to store information corresponding to the transmissions to a networked repository.

13. The apparatus according to claim 8, wherein the processor is further configured to generate a report including the signal or information corresponding to the signal based on a request, received via the communication interface, to transmit the report to an administrative agency, and the communication interface is further configured to transmit the report to the administrative agency.

* * * * *